April 22, 1930.  A. FRUWIRTH  1,755,177
SCALE AND ATTACHMENT FOR REDUCING AND ENLARGING CAMERAS
Filed Dec. 7, 1927  4 Sheets-Sheet 1
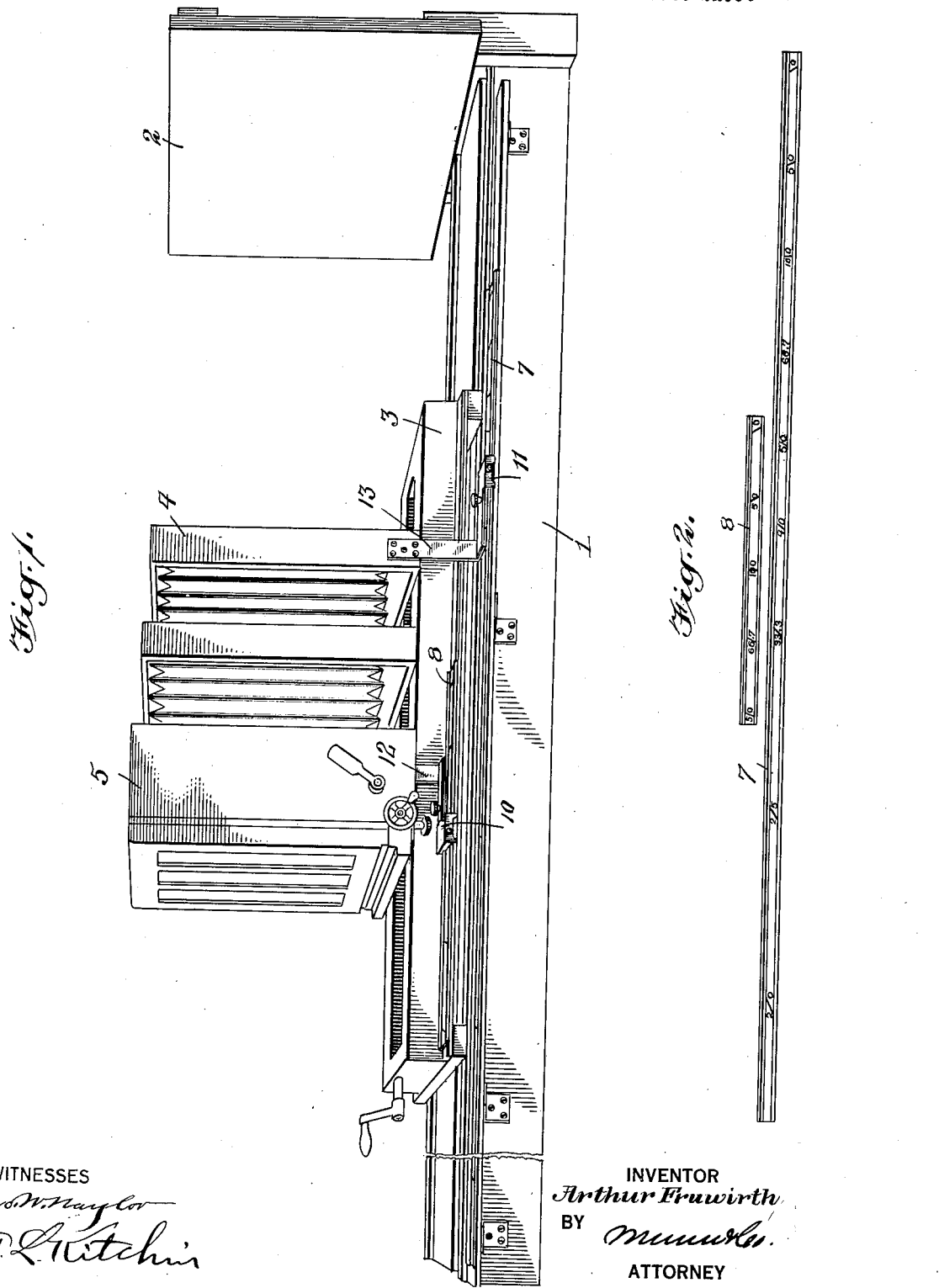

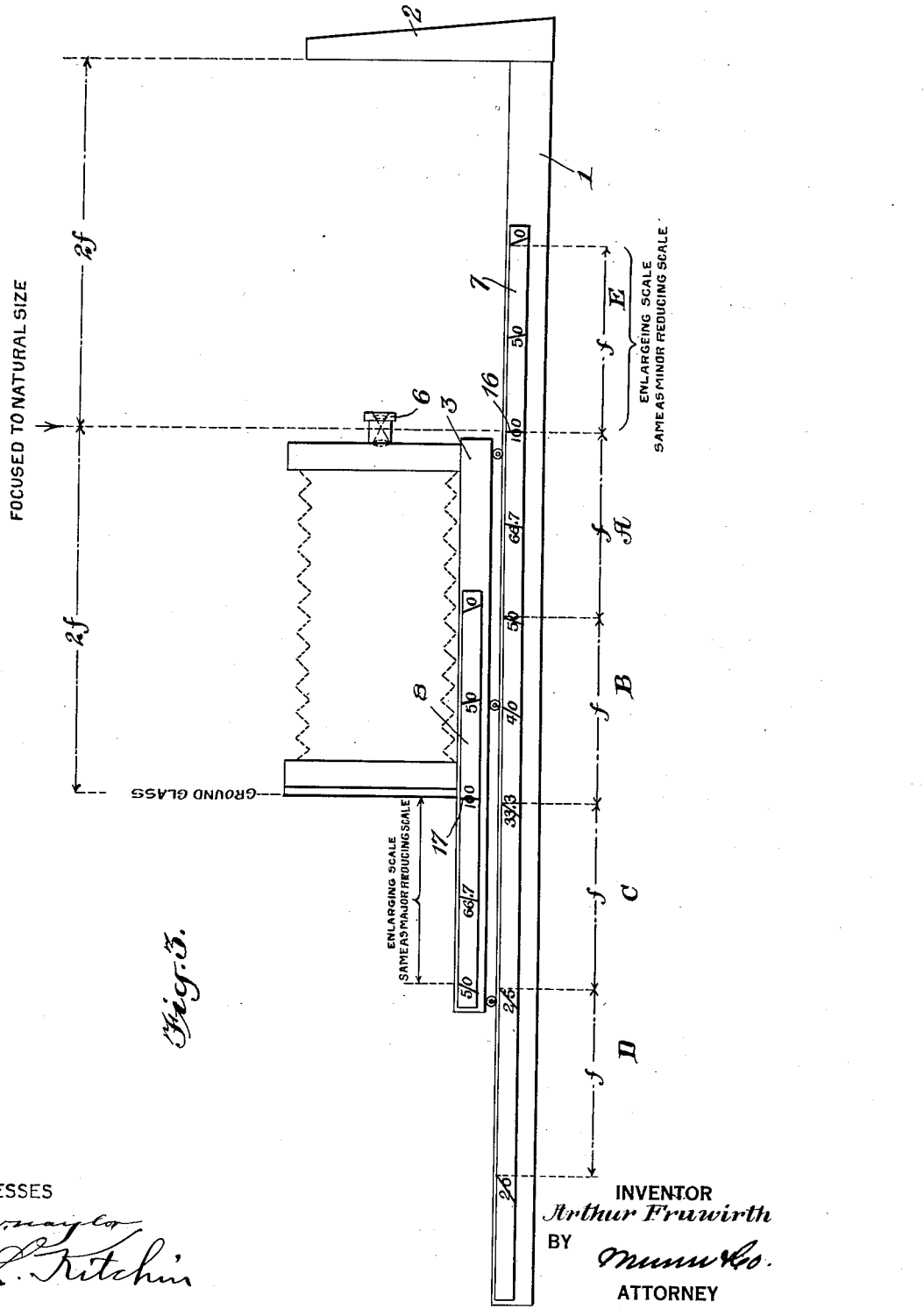

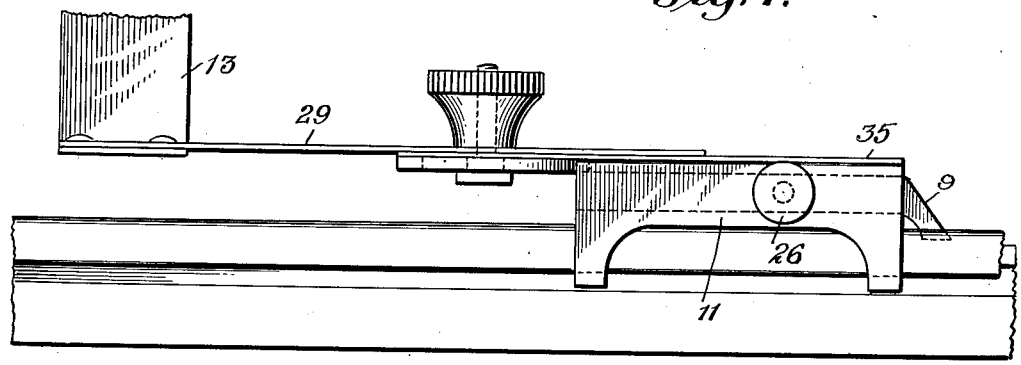
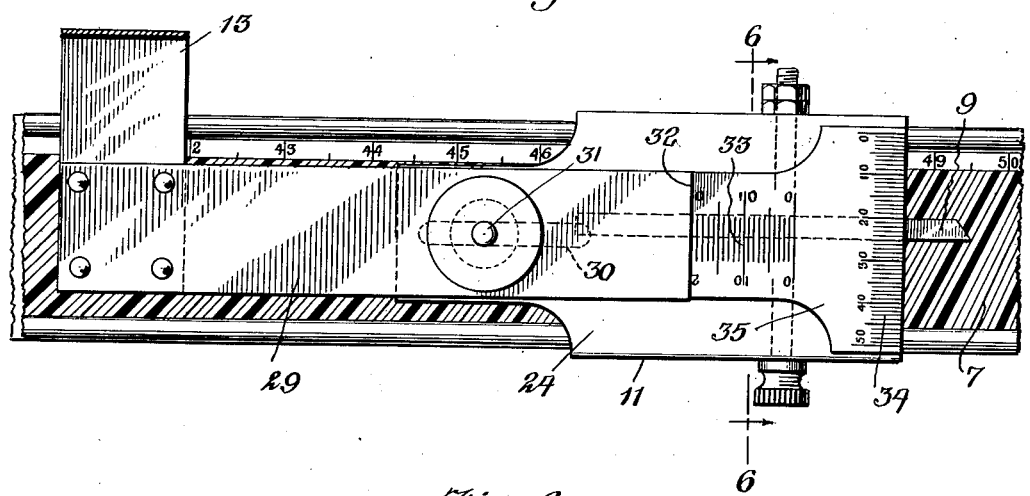
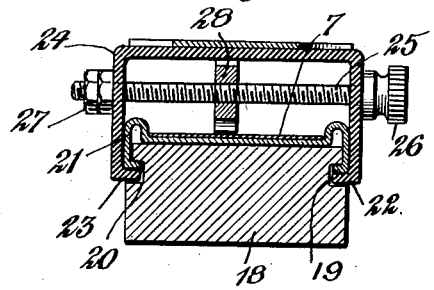

April 22, 1930. A. FRUWIRTH 1,755,177
SCALE AND ATTACHMENT FOR REDUCING AND ENLARGING CAMERAS
Filed Dec. 7, 1927 4 Sheets-Sheet 4
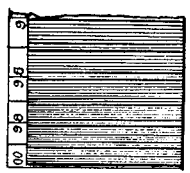
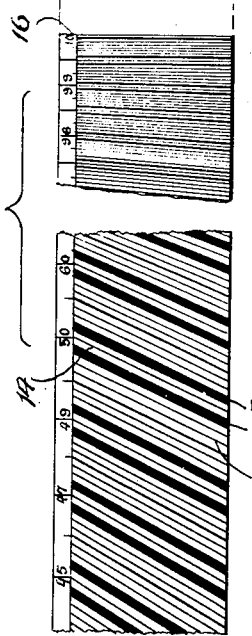
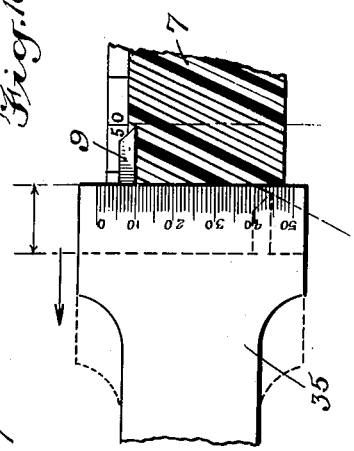
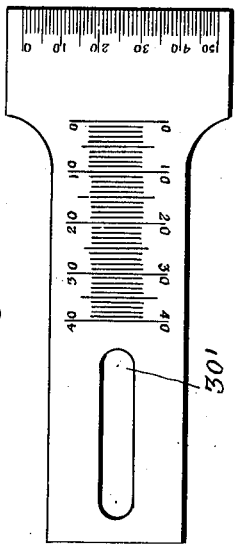
INVENTOR
Arthur Fruwirth
BY
ATTORNEY Patented Apr. 22, 1930

1,755,177

UNITED STATES PATENT OFFICE

ARTHUR FRUWIRTH, OF BROOKLYN, NEW YORK

SCALE AND ATTACHMENT FOR REDUCING AND ENLARGING CAMERAS

Application filed December 7, 1927. Serial No. 238,355.

This invention relates to an improved scale and certain co-acting attachments for use on enlarging and reducing cameras, the object being to provide a construction of scale and associated parts which may be quickly and accurately connected to a camera without being made especially for the particular lens used in that camera.

Another object of the invention is to provide a scale for enlarging and reducing cameras, wherein means are provided whereby the scale and associated parts may be adjusted to take care of any slight variation in the focal length of the lens of the camera.

A still further object of the invention is to provide in a reducing camera, a pair of similarly formed scales, one being arranged on the stationary part of the camera and the other on the movable part with graduations which co-act accurately to permit a person to quickly secure an accurate focus by placing the various parts of the camera in certain different relationships with the scales.

In the accompanying drawings—

Figure 1 is a perspective view of part of an enlarging and reducing camera, together with a scale and associated parts embodying the invention.

Figure 2 is a plan view of the scales used in Figure 1, the same being on a somewhat enlarged scale.

Figure 3 is a schematic view, principally in side elevation, showing the relative position of the two scales, camera bed, lens and ground glass.

Figure 4 is a side view on an enlarged scale, of part of the camera bed shown in Figure 1, together with part of a scale, guide and associated parts embodying certain features of the invention.

Figure 5 is a top plan view of the structure shown in Figure 4.

Figure 6 is a sectional view through Figure 5 on line 6—6.

Figure 7 is a detail fragmentary plan view showing part of the minor scale illustrated in Figures 2 and 3, the same being on an enlarged scale.

Figure 8 is a view similar to Figure 7 but showing the major scale.

Figure 9 is a top plan view of the gage embodying certain features of the invention.

Figure 10 is a top plan view of part of the gage shown in Figure 9, together with an indicating pointer embodying certain features of the invention.

Referring to the accompanying drawings by numerals, 1 indicates the base of an enlarging and reducing camera, and 2 the work support board. The base 1 is provided with the usual runways and arranged on these runways is the usual carriage 3 having the usual focus frame 4 and image frame 5. The frame 4 carries a lens 6 in the usual manner, and the frames 4 and 5 are connected with a bellows in the usual manner. The parts described are old and well known and, therefore, form no part of the present invention except in combination.

A camera built as just described, can be used readily by a good photographer and good work secured. In order to secure the same size, an enlargement or a reduction, the cameraman must place the lens 6 the right distance from the board 2 and then adjust the frame 5. Sometimes it is necessary to adjust both frames 4 and 5 a number of times before the image is sharp on the ground glass and is of the proper or desired size. This will take a comparatively long time when done manually by the cameraman. When done properly the work, however, is very accurate. Sometimes in securing an accurate focus and an accurate size of enlargement or reduction, it may take a cameraman a half hour to secure these results. According to the present invention, a pair of scales and certain other members are provided whereby even an inexperienced person may quickly and accurately focus the camera for any desired size. This work also may be done by reason of the scale and other parts of the invention, within a very short time, as for instance, ten seconds.

Heretofore, scales for mechanically finding the focus have been provided, as for instance, the scales and apparatus shown in my prior Patent No. 1,401,902, issued December 27, 1921. In this patent, as well as in other patents, the arrangement is such that each scale is accurately made for each lens, or in other words, an individual scale is made for each individual camera. Where the lens 6 of the camera is re-polished, this will destroy the accuracy of the scales and a new scale especially made for the re-polished lens is necessary. It was also necessary to have an expert mount the scales in place. By reason of these facts, the scales in my prior patent, and also other scales used, are necessarily very expensive and the work of mounting is expensive. In the present invention, an improved form of scale and certain co-acting attachments have been provided, whereby slight variations in the lens 6 may be taken care of by suitably adjusting the various parts. For instance, if the focal length of the lens 6 was eighteen inches, a stock scale made for an eighteen inch lens could be quickly mounted on the camera and tested. If it is found that the lens 6 of that particular camera has a slightly longer or shorter focal length, the various attachments could be adjusted in respect to the scale and thus the difference in focal length of the lens taken care of and an accurate focusing secured thereafter. In case the lens was re-polished, a slight adjustment of certain parts hereinafter fully described, would take care of the different focal lengths caused by said re-polishing and a new scale would not be necessary as is the case with scales heretofore used. Scales made for other focal lengths of lenses would function in the same manner.

As indicated particularly in Figure 3, the major scale 7 is secured by screws, tacks or otherwise, to the base 1. In securing the scale to the base 1, it is positioned so that the graduation indicated by the legend 100, is two focal lengths from the face of the board 2. The minor scale 8 is secured to the carriage 3 by tacks or other suitable means, and is positioned so that the graduation indicated by 100 on the minor scale, will be in line with the front face of the ground glass when the graduation 100 of the major scale is in line with the longitudinal center of lens 6. As indicated in Figure 3, the graduation 100 on the major scale, is positioned two focal lengths from the face of board 2 and the graduation 100 on the minor scale 8, is positioned two focal lengths from the center of the lens 6. If the scales 7 and 8 have been absolutely accurately positioned, and if the lens 6 is absolutely accurate and of the exact focal length specified, the image on the ground glass will be the natural size and will be as sharp as the camera can make the same. However, if either of the scales are slightly too far forward or too far rearward, or if the lens 6 has a slightly greater or slightly less focal length, then a sharp image will not be secured. This may be tested in the usual manner by a cameraman by looking at the ground glass, and when this has been found not to be true, both the lens 6 and the ground glass are shifted back and forth as desired until an absolutely accurate focus is secured. When this has been done, the scales 7 and 8 may be re-set if desired, but if the adjustment is only very slight, the indicator or pointer 9 is shifted one way or the other as may be necessary to cause the end to contact with the desired graduation. As for instance, in Figure 5, the pointer 9 has been moved over laterally of the scale until it contacts with the graduation or line 50.

When the parts are arranged as shown in Figure 3, the end of the pointer 9 will be on the line 100. As shown in Figure 1, there are provided identically constructed attachments 10 and 11 secured to the brackets 12 and 13 respectively, which are connected to the frames 4 and 5 respectively. The attachments 10 and 11 are formed as shown in Figures 4 to 10 inclusive, and each carries a pointer 9, attachment 11 co-operating with the major scale, while the attachment 10 co-operates with the minor scale. As both of these attachments or indicators are identical, the description of one will apply to both. As indicated in these figures, the respective scales 7 and 8 are formed with diagonally positioned graduations 14, with suitable dark spacing lines 15 to set off the various graduations 14. A number of intermediate graduations 14' are provided for smaller subdivisions. In addition to the slanting or inclined graduations 14, there is provided a positioning line 16 for the major scale 7 and a positioning line 17 for the minor scale 8. These positioning lines are at right angles to the length of the respective scales so that if all parts are accurate, including the lens, a proper accurate focus will be secured when the end of the pointer or indicating bar 9 is contacting with these lines. In forming the remaining graduations, they are inclined from these respective positioning lines. As clearly indicated in Figure 3, the line 66.7 is inclined to a small extent, while the line 50 is inclined more, and line or graduation 25 is inclined very much more. The same thing holds true of the minor scale 8, while the enlarging section E of the scale 7 has the graduation inclined in the opposite direction. For the purpose of clearly understanding the structure, the scale 7 has been indicated in Figure 3 as divided into sections, each section indicating a focal length, said sections being represented as A, B, C and D, and the enlarging section as section E. The end of the indicating bar or pointer 9 is preferably a knife edge so as to provide means whereby accurate focusing can be secured. This end or knife edge is placed at 100 on both scales when first positioning and testing the scales. If all parts are absolutely accurate, the focus will be accurate under these circumstances, and also as the carriage or base of the camera is shifted back and forth, other focuses will be accurate. However, in view of slight inaccuracies in certain parts, and specially in the lens 6, additional adjustments must be secured. Usually in mounting the parts in position, the first test is with the parts located as shown in Figure 3. The next test would be to move the parts for half natural size, whereupon the knife edge or end of the indicating bar 9 on frame 4 would be exactly in line with the center of the positioning line 50 shown in Figure 3. The indicating bar 9 with frame 5 would be likewise brought to the center of the graduation 50 on the minor scale. If the focus is correct at this new adjustment, and also correct for the natural size, the scales are then correctly positioned and correctly proportioned to be accurately focused for other sizes.

As indicated particularly in Figures 3 to 6, the base 1 of the camera is provided with what may be termed a molding or runway 18 having grooves 19 and 20 adapted to receive turned in portions of the metal strip 21, which metal strip carries the scale 7. When the scale has been properly positioned, it is fastened down by screws, tacks or other means so that neither the scale 7 nor its supporting strip 21, can be moved. It is evident that some other means of mounting the scale 7 could be provided without departing from the spirit of the invention. The grooves 19 and 20 also accommodate turned in ends or shoes 22 and 23 of a housing 24, which housing is preferably of metal and which carries a transverse screw 25 having a thumb member 26 at one end and suitable stops 27 at the opposite end, said stops being shown as nuts whereby screw 25 may freely rotate but cannot move longitudinally. The indicator bar or pointer 9 is provided with a threaded aperture 28 through which the screw 25 extends, and then upon the rotation of screw 25, pointer 9 will be moved transversely of the scale 7.

By reason of the shoes 22 and 23 which do not tightly fit the grooves in which they are placed, but fit the same sufficiently to permit easy sliding action, one that will not allow much loose motion, a carrier is provided for the indicating bar 9 and other parts which may be moved by the camera. In the case of the major scale, the bracket 13 is connected to a link 29, which link is provided with an aperture for accommodating the bolt 31 and which bolt extends through a slot 30 in the top of the housing 24. This slot extends longitudinally of the scale so as to provide a certain adjustment when necessary. The front end 32 of link 29 is adapted to be posioned at a desired point over the scale 33, while the scale or numbered rule 34 extends transversely of the device for indicating the relative position of the indicator bar 9. The scale 32 and rule 34 are formed on a plate 35 of metal or other desired material, said plate extending to the end of the housing 24 and formed with a slot 30' as shown in Figure 9 registering with slot 30.

From the drawing it will be noted that one link of molding 18 is attached to the base of the camera and another and longer similarly formed molding is attached to one side of the stand 1. Brass channel 21 containing the minor focusing scale, is slipped over the molding on the base of the camera, while the brass channel 21 containing the major scale, is slipped over the molding on the base 1; then an indicator is slipped over each channel and fastened respectively to the image frame and the lens frame by means of brackets 12 and 13. When the carriage 3 is moved over the stand or base 1, the indicator is drawn along over the major scale channel and when the image frame 5 of the camera is moved over the carriage 3, the indicator including the indicating bar 9, is drawn over the minor scale.

In order to adjust the scales to the focal length of lens, two operations are necessary. Both scale channels 21 and their respective scales, are slid along until the end of the indicating bar 9 extends exactly over the positioning lines for natural size, namely, over the lines indicated by 100 in Figure 3. These lines are perpendicular to the whole channel or scale and partly to the screw 25, the turning of which does not affect reading of the indicator bar 9 with regard to the positioning lines for natural size.

After the first adjustment has been secured as just stated, in all probability the guiding edge or end of indicator bar 9 will not stand above the point of the slanting positioning lines for half size (50 per cent), but will be to the right or left of them. It will be understood that the indicating bar 9 is set centrally of the scales before the adjustment begins. In case the end of indicator bar 9 is to the right or left as stated, screw 25 is rotated in the desired direction to bring the end of bar 9 accurately over the positioning line indicated as one-half size. This will complete the adjustment of the scales, and they may then be permanently fastened in place.

If the two foci (for the natural and half size), are taken correctly, then the two indicator bars 9 must register over identical lines of the rule 34 on top of the indicator housing 24. If they do not, it is conclusive proof that the focusing was done imperfectly and the focusing scale will not work. In a case of this kind, the focusing has to be repeated until the indicator bars 9 register correctly. If the rule 34 on top of the housing 24 consists of focal indicia of thirty-two equi-distant lines and the focusing scale has a latitude of one-half inch in focal length, then each shifting of the indicator bar by one line on rule 34 represents a change of focal length of one-sixty-fourth of an inch.

From Figures 5 and 9, it will be noted that a second rule or scale 33 is provided on top of the housing 24, and is ordinarily about one and one quarter inches long, though it could be much longer if desired, and is positioned at right angles to the rule 34. The function of this rule is to further assist the fine adjustment of the focusing scale. The indicator is connected to the camera by means of a link 29, and is formed so that the effective length can be varied by means of the clamping screw 31 and slots 30 and 30'. Instead of shifting the scale 7 for fine adjustment, the housing 24 and member 35 and associated parts, may be shifted including the indicator bar 9 without shifting link 29 or the camera. After the desired shifting action has taken place, the screw 31 is tightened so as to lock the parts rigidly together. This shifting is only done after the frames 4 and 5 of the camera have been correctly positioned.

What I claim is:

1. The combination with a process or copying camera, of a pair of focusing scales co-acting therewith, said scales consisting of a minor conjugate scale and a major conjugate scale, said minor scale being attached to the carriage of the camera and the major scale to the stationary base of the camera, both of said scales having a zero graduation line and other lines at angles to the zero line, the angles of said other lines being greater as the distance increases from the zero line, a pointer connected to the lens frame of the camera positioned to move over the major scale, and a second pointer secured to the ground glass frame positioned to move over the minor scale, said pointers coacting with said graduation lines to rectify inaccuracies in the lens.

2. In a process or copying camera, a pair of focusing scales co-acting therewith, one of said scales being a minor scale connected to the carriage of the camera and the major scale being attached to the stationary part of the camera, said major scale being formed with graduations indicating the positions of the lens with regard to the object to be photographed for any desired ratio of reduction or enlargement, a pointer connected with the lens carrying frame of the camera positioned to travel over said major scale, and a second pointer carried by the ground glass frame positioned to travel over the minor scale, each of said scales having a zero line and progressively slanting lines on each side thereof.

3. A focusing scale formed with a positioning line extending at right angles to the length of the scale, and auxiliary positioning lines on each side of the first mentioned positioning line, said auxiliary positioning lines being non-parallel and slanting from one edge of the scale to the other and representing different focal lengths at different distances from said edge.

4. A pair of focusing scales for copying cameras, comprising a strip for each scale having non-parallel graduations thereon indicating the positions of the lens with regard to the object to be photographed and the position of the ground glass, and means coacting with said strips having graduations thereon capable of adjustment to compensate for lenses of different focal lengths.

5. In a copying camera, a focusing scale provided with non-parallel graduations thereon indicating the positions of the lens with regard to the object to be photographed for any desired ratio of reduction or enlargement, a pointer carried by the lens frame moving over said non-parallel graduations, and means for adjusting said pointer in respect to said graduations to compensate for lens aberrations.

6. In a copying camera, a major conjugate scale having non-parallel graduations thereon adapted to be connected with the stationary part of the camera, a minor conjugate scale having non-parallel graduations thereon adapted to be connected with the movable part of the camera, said major scale indicating the positions of the lens with regard to the object to be photographed and the minor conjugate scale indicating the position of the ground glass frame, an indicator carried by the lens frame positioned to move over said major scale, an indicator carried by the ground glass frame positioned to move over the minor scale, means on each indicator for moving the same longitudinally of the scales to secure an accurate adjustment, and means for moving certain parts of the indicators transversely of the respective scales to contact with one of said non-parallel graduations at some point for compensating for slight difference in focal lengths of the lens.

7. In a scale, an indicating structure for copying cameras, a major scale secured to the stationary part of the camera and formed with graduations indicating the positions of the lens with regard to the object to be photographed for any desired ratio of reduction and enlargement, a minor scale secured to the carriage of the camera formed with graduations indicating the position of the ground glass frame, identically constructed indicators secured respectively to the lens frame and ground glass frame, said indicators moving over respectively the major and minor scales, each of said major and minor scales having graduations extending at an angle from one side to the other, each of said indicators having a pointer adapted to travel over said graduations substantially transversely thereof as the camera is moved to focusing position, each of said pointers having a threaded aperture, a guide extending transversely of the scale and a fixed screw carried by each indicator coacting with the threads of said threaded aperture for moving the pointer thereof transversely of the scale.

8. In a scale, an indicating structure for copying cameras, a major scale secured to the stationary part of the camera and formed with graduations indicating the positions of the lens with regard to the object to be photographed for any desired ratio of reduction and enlargement, a minor scale secured to the carriage of the camera formed with graduations indicating the position of the ground glass frame, identically constructed indicators secured respectively to the lens frame and ground glass frame, said indicators moving over respectively the major and minor scales, each of said major and minor scale having graduations extending at an angle from one side to the other, each of said indicators having a pointer adapted to travel over said graduations substantially transversely thereof as the camera is moved to focusing position, each of said pointers having a threaded apertured portion acting as a traveling nut, a screw carried by each indicator coacting with said threaded nuts for moving the pointer thereof transversely of the scale, and a scale carried by each of said indicators positioned to extend at right angles to the general direction of the respective major and minor scales and co-acting with the pointers of said indicators whereby the transverse positions of the respective pointers of the indicators can be brought into exact registry.

9. In a copying camera, a pair of focusing scales for said camera and an indicator for each of said scales, securing means for each indicator for connecting the respective indicators to said focusing scales, each of said indicators having a pointer, each of said pointers having a threaded apertured portion acting as a traveling nut, a screw coacting with each of said traveling nuts for moving the pointers transversely of the scales, a transverse scale mounted on the indicators for indicating the relative transverse positions of the pointers, means for varying the position of the indicators in respect to said securing means for providing longitudinal adjustment of the indicators independent of the moving parts of the camera and a longitudinal scale mounted on each indicator for indicating the amount of adjustment of the indicators.

Signed at New York city, in the county of New York and State of New York, this 3rd day of December A. D. nineteen hundred and twenty seven.

ARTHUR FRUWIRTH.